United States Patent
Barrick et al.

(10) Patent No.: US 11,419,254 B2
(45) Date of Patent: Aug. 23, 2022

(54) SYSTEM AND METHOD FOR DETECTING LEVELNESS OF TOOLS OF A TILLAGE IMPLEMENT BASED ON TOOL LOADING

(71) Applicant: CNH Industrial Canada, Ltd., Saskatoon (CA)

(72) Inventors: Christopher Barrick, Morton, IL (US); James W. Henry, Saskatoon (CA); Robert Zemenchik, Fair Oaks, CA (US)

(73) Assignee: CNH Industrial Canada, Ltd., Saskatoon (CA)

(*) Notice: Subject to any disclaimer, the term of this patent is extended or adjusted under 35 U.S.C. 154(b) by 361 days.

(21) Appl. No.: 16/665,401

(22) Filed: Oct. 28, 2019

(65) Prior Publication Data
US 2021/0120726 A1    Apr. 29, 2021

(51) Int. Cl.
*A01B 63/00*  (2006.01)
*A01B 63/114* (2006.01)
*A01B 63/28*  (2006.01)

(52) U.S. Cl.
CPC .......... *A01B 63/008* (2013.01); *A01B 63/114* (2013.01); *A01B 63/28* (2013.01)

(58) Field of Classification Search
CPC ..... A01B 63/008; A01B 63/10; A01B 63/111; A01B 63/1112; A01B 63/1115; A01B 63/114; A01B 63/28; A01B 71/04
See application file for complete search history.

(56) References Cited

U.S. PATENT DOCUMENTS

| 4,031,963 A | * | 6/1977 | Poggemiller ........ A01B 63/114 172/4 |
| 4,273,056 A | | 6/1981 | Loefgren et al. |
| 5,042,586 A | | 8/1991 | Spencer et al. |
| 5,709,271 A | | 1/1998 | Bassett |
| 5,988,000 A | | 11/1999 | Adams |

(Continued)

FOREIGN PATENT DOCUMENTS

CN    108541495 A    9/2018

OTHER PUBLICATIONS

Extended European Search Report Corresponding to Application No. 20204444.2 dated Mar. 26, 2021 (6 pages).

*Primary Examiner* — Jessica H Lutz
(74) *Attorney, Agent, or Firm* — Rebecca L. Henkel; Rickard K. DeMille

(57) ABSTRACT

A system for detecting the levelness of ground engaging tools of a tillage implement including an agricultural implement including a frame and tool assemblies supported relative to the frame. The tool assemblies each include a toolbar coupled to the frame and one or more ground engaging tools coupled to the toolbar. The system further includes sensors coupled to two of the tool assemblies and configured to capture data indicative of a load acting on the one or more ground engaging tools of the tool assemblies. Additionally, the system includes a controller configured to monitor the data received from the sensors and compare at least one monitored value associated with the load acting on the ground engaging tool(s) of each of the tool assemblies. Moreover, the controller is further configured to identify the ground engaging tool(s) are not level when the monitored value(s) differ by a predetermined threshold value.

20 Claims, 6 Drawing Sheets

(56) References Cited

U.S. PATENT DOCUMENTS

| | | | |
|---|---|---|---|
| 6,041,582 A | 3/2000 | Tiede et al. | |
| 7,028,554 B2 | 4/2006 | Adamchuk et al. | |
| 7,686,095 B2 | 3/2010 | Batthala et al. | |
| 8,453,754 B2 * | 6/2013 | Beaujot | A01B 63/023 172/2 |
| 8,827,001 B2 | 9/2014 | Wendte et al. | |
| 8,857,530 B2 * | 10/2014 | Henry | A01B 63/114 172/4 |
| 9,095,090 B2 * | 8/2015 | Casper | A01B 79/005 |
| 9,144,199 B2 | 9/2015 | Ritter et al. | |
| 9,232,687 B2 * | 1/2016 | Bassett | A01B 61/048 |
| 9,338,937 B2 | 5/2016 | Sauder et al. | |
| 10,178,823 B2 * | 1/2019 | Kovach | A01B 63/114 |
| 10,412,878 B2 * | 9/2019 | Karstens | A01B 63/002 |
| 10,440,876 B2 * | 10/2019 | Sporrer | A01B 5/04 |
| 10,517,238 B2 * | 12/2019 | Sporrer | A01G 25/097 |
| 10,729,068 B2 * | 8/2020 | Wu | A01B 63/111 |
| 10,750,656 B2 * | 8/2020 | Stanhope | A01B 35/08 |
| 10,820,490 B2 * | 11/2020 | Schoeny | A01C 7/006 |
| 10,838,432 B2 * | 11/2020 | Barrick | A01B 79/005 |
| 10,869,422 B2 * | 12/2020 | Manternach | G05B 19/401 |
| 10,959,367 B2 * | 3/2021 | Zemenchik | A01B 79/005 |
| 11,058,045 B2 * | 7/2021 | Harmon | A01B 49/027 |
| 11,064,643 B2 * | 7/2021 | Sporrer | A01B 63/002 |
| 2008/0267719 A1 | 10/2008 | Corcoran | |
| 2013/0032363 A1 | 2/2013 | Curry et al. | |
| 2014/0191857 A1 | 7/2014 | Sauder et al. | |
| 2014/0222302 A1 | 8/2014 | Pichlmaier | |
| 2014/0277968 A1 | 9/2014 | Ishikawa et al. | |
| 2019/0235529 A1 | 8/2019 | Barrick et al. | |
| 2019/0320574 A1 * | 10/2019 | Andrejuk | A01B 63/32 |
| 2019/0373797 A1 * | 12/2019 | Schoeny | A01C 7/203 |
| 2020/0029490 A1 * | 1/2020 | Bertucci | G05D 1/0274 |
| 2020/0093052 A1 * | 3/2020 | Preimess | A01B 63/111 |
| 2020/0154626 A1 * | 5/2020 | Schoeny | A01C 5/068 |
| 2020/0178454 A1 * | 6/2020 | Knobloch | A01B 79/005 |
| 2020/0236833 A1 * | 7/2020 | Kremmer | A01B 63/10 |
| 2020/0329626 A1 * | 10/2020 | Ferrari | G01S 15/08 |
| 2020/0359541 A1 * | 11/2020 | Ptacek | A01B 5/04 |
| 2020/0359545 A1 * | 11/2020 | Ptacek | A01C 5/068 |
| 2020/0359546 A1 * | 11/2020 | Ptacek | A01C 7/203 |
| 2020/0390018 A1 * | 12/2020 | Smith | A01B 61/046 |
| 2021/0307228 A1 * | 10/2021 | Egelund | A01D 89/004 |
| 2021/0307236 A1 * | 10/2021 | Strnad | A01C 7/006 |

\* cited by examiner

SYSTEM AND METHOD FOR DETECTING LEVELNESS OF TOOLS OF A TILLAGE IMPLEMENT BASED ON TOOL LOADING

FIELD OF THE INVENTION

The present disclosure generally relates to tillage implements and, more particularly, to systems and methods for detecting the levelness of ground engaging tools of a tillage implement based on the load acting on the ground engaging tools.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground engaging tools configured to penetrate the soil to a particular depth. In this respect, the ground engaging tools may be pivotally coupled to a frame of the tillage implement. Tillage implements may also include biasing elements, such as springs, configured to exert biasing forces on the ground engaging tools. This configuration may allow the ground engaging tools to maintain the particular depth of soil penetration as the agricultural work vehicle pulls the tillage implement through the field. Additionally, this configuration may also permit the ground engaging tools to pivot out of the way of rocks or other impediments in the soil, thereby preventing damage to the ground engaging tools or other components on the implement.

However, in certain situations, the ground engaging tools may not penetrate the soil to the same depth due to, for instance, height variation within the field. As an example, the ground engaging tools at one side of the implement may penetrate the soil to a greater degree than the ground engaging tools at the opposite side of the implement. As such, the ground engaging tools of the implement may not be level in relation to the soil to be cultivated. An unlevel implement may be associated with several disadvantages to the cultivation process and/or the tillage implement itself. Generally, the soil may be penetrated deeper than desired on one side of the implement and may not penetrate deep enough on the opposite of the implement. Thus, the unlevel implement may lead to locations of the field that are not cultivated to a sufficient degree, requiring the soil to be cultivated again at those locations. Further, the ground engaging tools that penetrate the soil to a greater degree may suffer from increased wear and require earlier replacement compared to ground engaging tools that penetrate to a lesser degree. Further, deeper penetrating ground engaging tools may impact deeper impediments in the soil that may damage the ground engaging tools.

Accordingly, an improved system and method for detecting the levelness ground engaging tools of a tillage implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for detecting the levelness of ground engaging tools of a tillage implement. The system includes an agricultural implement including a frame and a plurality of tool assemblies supported relative to the frame. Each tool assembly includes a toolbar coupled to the frame and one or more ground engaging tool coupled to the toolbar. The system further includes a first sensor coupled to a first tool assembly. The first sensor is configured to capture data indicative of a load acting on the ground engaging tool(s) of the first tool assembly. The system additionally includes a second sensor coupled to a second tool assembly. The second sensor is configured to capture data indicative of a load acting on the ground engaging tool(s) of the second tool assembly. Additionally, the system includes a controller configured to monitor data received from the first sensor and the second sensor and compare one or more first monitored values associated with the load acting on the around engaging tool(s) of the first tool assembly to one or more second monitored values associated with the load acting on the ground engaging tool(s) of the second tool assembly. Moreover, the controller is configured to identify that at least a portion of the ground engaging tools are not level when the first monitored value(s) differs from the second monitored value(s) by a predetermined threshold value.

In another aspect, the present subject matter is directed to a method for detecting the levelness of ground engaging tools of a tillage implement. The implement includes an implement frame and two or more tool assemblies supported relative to the frame. Each tool assembly includes a toolbar coupled to the frame and one or more ground engaging tools coupled to the toolbar. The method includes controlling, with a computing device, an operation of the tillage implement as the implement is being moved across the field. The method further includes monitoring, with the computing device, a load acting on the ground engaging tool(s) of a first tool assembly based on data received from a sensor associated with the first tool assembly. The method further includes monitoring, with the computing device, a load acting on the ground engaging tool(s) of a second tool assembly based on data received from a sensor associated with the second tool assembly. Additionally, the method includes comparing one or more first monitored values associated with the load acting on the at ground engaging tool(s) of the first tool assembly to at one or more second monitored values associated with the load acting on the ground engaging tool(s) of the second tool assembly. The method also includes identifying that at least a portion of the ground engaging tools are not level when the first monitored value(s) differs from the second monitored value(s) by a predetermined threshold value for a predetermined length of time.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
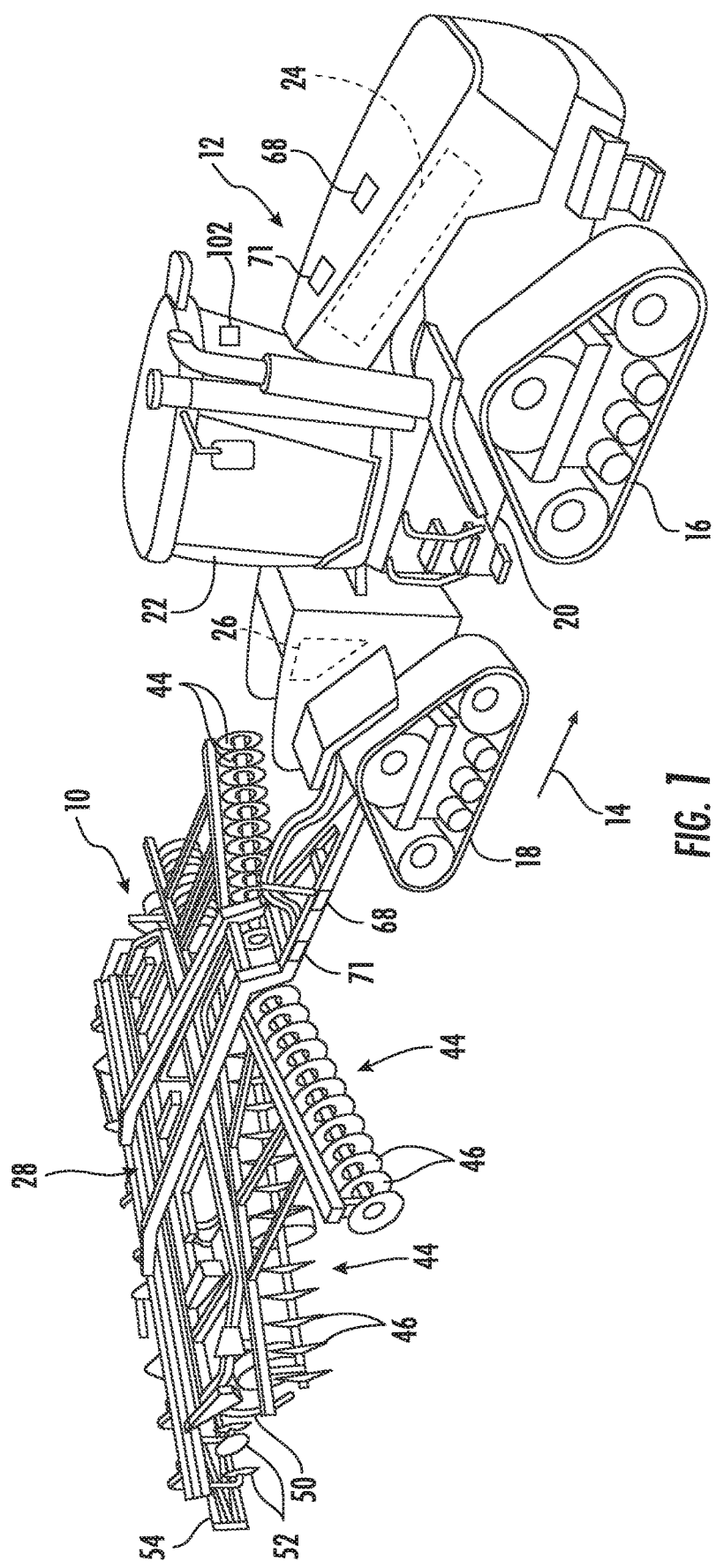
FIG. 1 illustrates a perspective view of one embodiment of a tillage implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting the levelness of ground engaging tools of a tillage implement. Specifically, in several embodiments, a controller of the disclosed system may be configured to receive data indicative of a draft load applied to one or more ground engaging tools of separate tool assemblies of the implement, such as to disc blades supported by disc gang assemblies. The difference in the draft load applied to the ground engaging tool(s) of separate tool assemblies may, in turn, be indicative of the levelness of at least a portion of the ground engaging tools. For instance, the controller may be configured to monitor the data received from one or more force sensors associated with the ground engaging tool(s) of separate tool assemblies and compare a difference in the monitored values to a predetermined threshold value set for the ground engaging tool(s). For example, the ground engaging tool(s) may be one or more disc blades attached to hangers of disc gang assemblies. In such a circumstance, the sensors may be coupled to the hangers of the disc gang assemblies to communicate data indicative of the draft load on the disc blade(s).

In several embodiments, the difference in the loads acting on the ground engaging tools of separate tool assemblies may be indicative of the levelness of at least a portion of the ground engaging tools. Specifically, a difference between loads applied to the ground engaging tool(s) of separate tool assemblies greater than a predetermined load threshold over a predetermined length of time may indicate at least a portion of the ground engaging tools are not level, are operating too deeply, are being towed to the field at too quickly, or have encountered an obstruction. As another example, a difference between loads applied to the ground engaging tool(s) of separate tool assemblies greater than a predetermined load range or less than a predetermined load range over a predetermined length of time may indicate at least a portion of the ground engaging tools are not level are, operating too deeply, are being towed to the field at too quickly, or have encountered an obstruction. For instance, the controller may be configured to identify that at least a portion of the ground engaging tools are not level when the difference in monitored load values is greater than the load threshold or fall outside the load range. The identification of, for example, unlevel ground engaging tools may allow for the operator to take corrective action. Alternatively, the controller may be configured to automatically execute a corrective action adapted to level the ground engaging tools.

Figure 2:
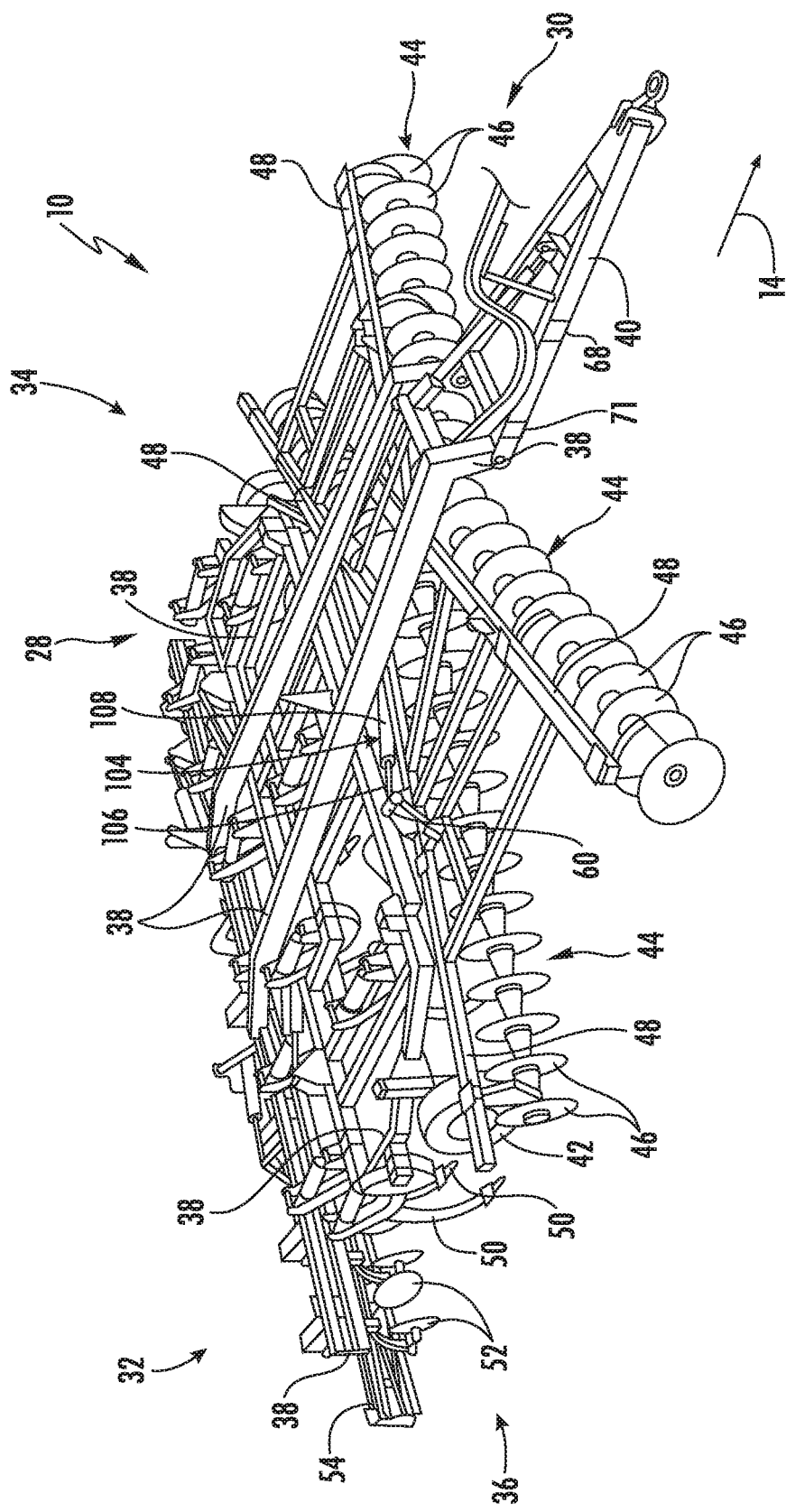
FIG. 2 illustrates an alternative perspective view of the tillage implement in accordance with aspects of the present subject matter, particularly illustrating various components of the implement.

Referring now to the drawings. FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 102) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown in FIG. 2) may be coupled to the frame 28 to facilitate towing the implement 10 in the direction of travel 14. As further illustrated, at least one of work vehicle 12 or the implement 10 may include a sensor 71 configured to provide data indicative of a speed of the agricultural implement 10 as the agricultural implement 10 is moved across the field, such as a ground speed sensor providing data indicative of the ground speed of the implement 10 and/or the work vehicle 12. As shown particularly in FIG. 1, at least one of work vehicle 12 or the implement 10 may include a sensor 68 configured to provide data indicative of a location of the agricultural implement 10 as the agricultural implement 10 is moved across the field, such as a global positioning system (GPS) sensor providing data indicative of the location of the agricultural implement 10 and/or the work vehicle 12.

In several embodiments, one or more ground engaging tools may be coupled to and/or supported by the frame 28. In such embodiments, the ground engaging tool(s) may, for example, include one or more ground-penetrating tools. More particularly, in certain embodiments, the ground engaging tools may include one or more shanks 50 and/or disc blades 46 supported relative to the frame 28. In one embodiment, each shank 50 and/or disc blade 46 may be individually supported relative to the frame 28. Alternatively, one or more groups or sections of the ground engaging tools may be ganged together to form one or more ganged tool assemblies, such as the disc gang assemblies 44 shown in FIGS. 1 and 2.

As illustrated in FIG. 2, each disc gang assembly 44 includes a toolbar 48 coupled to the implement frame 28 and a plurality of disc blades 46 supported by the toolbar 48 relative to the implement frame 28. Each disc blade 46 may, in turn, be configured to penetrate into or otherwise engage the soil as the implement 10 is being pulled through the field. As is generally understood, the various disc gang assemblies 44 may be oriented at an angle relative to the direction of travel 14 to promote more effective tilling of the soil. In the embodiment shown in FIGS. 1 and 2, the implement 10 includes four disc gang assemblies 44 supported on the frame 28 at a location forward of the shanks 50, such as by including two forward disc gang assemblies 44 and two rear disc gang assemblies 44 positioned adjacent to the forward end 30 of the implement 10. However, it should be appreciated that, in alternative embodiments, the implement 10 may include any other suitable number of disc gang assemblies 44, such as more or fewer than four disc gang assemblies 44. Furthermore, in one embodiment, the disc gang assemblies 44 may be mounted to the frame 28 at any other suitable location, such as adjacent to its aft end 32.

Moreover, in several embodiments, the implement 10 may include a plurality of disc gang actuators 104 (one is shown in FIG. 2), with each actuator 104 being configured to move or otherwise adjust the orientation or position of one of the disc gang assemblies 44 relative to the implement frame 28. For example, as shown in FIG. 2, a first end of each actuator 104 (e.g., a rod 106 of the actuator 104) may be coupled to a toolbar 48 of the corresponding disc gang assembly 44, while a second end of each actuator 104 (e.g., the cylinder 108 of the actuator 104) may be coupled to the frame 28. The rod 106 of each actuator 104 may be configured to extend and/or retract relative to the corresponding cylinder 108 to adjust the angle of the corresponding disc gang assembly 44 relative to a lateral centerline (not shown) of the frame 28 and/or the penetration depth of the associated disc blades 46. Furthermore, the rod 106 of each actuator 104 may be configured to extend and/or retract relative to the corresponding cylinder 108 to adjust a down-force applied by the actuator(s) 104 to the disk gang assembly 44, and thus the disc blades 46, and/or to adjust a penetration depth of the disc blades 46. In the illustrated embodiment, each actuator 104 corresponds to a fluid-driven actuator, such as a hydraulic or pneumatic cylinder. However, it should be appreciated that each actuator 104 may correspond to any other suitable type of actuator, such as an electric linear actuator.

It should be appreciated that, in addition to the shanks 50 and the disc blades 46, the implement frame 28 may be configured to support any other suitable ground engaging tools. For instance, in the illustrated embodiment, the frame 28 is also configured to support a plurality of leveling blades 52 and rolling (or crumbles) basket assemblies 54. In other embodiments, any other suitable ground engaging tools may be coupled to and supported by the implement frame 28, such as a plurality closing discs.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
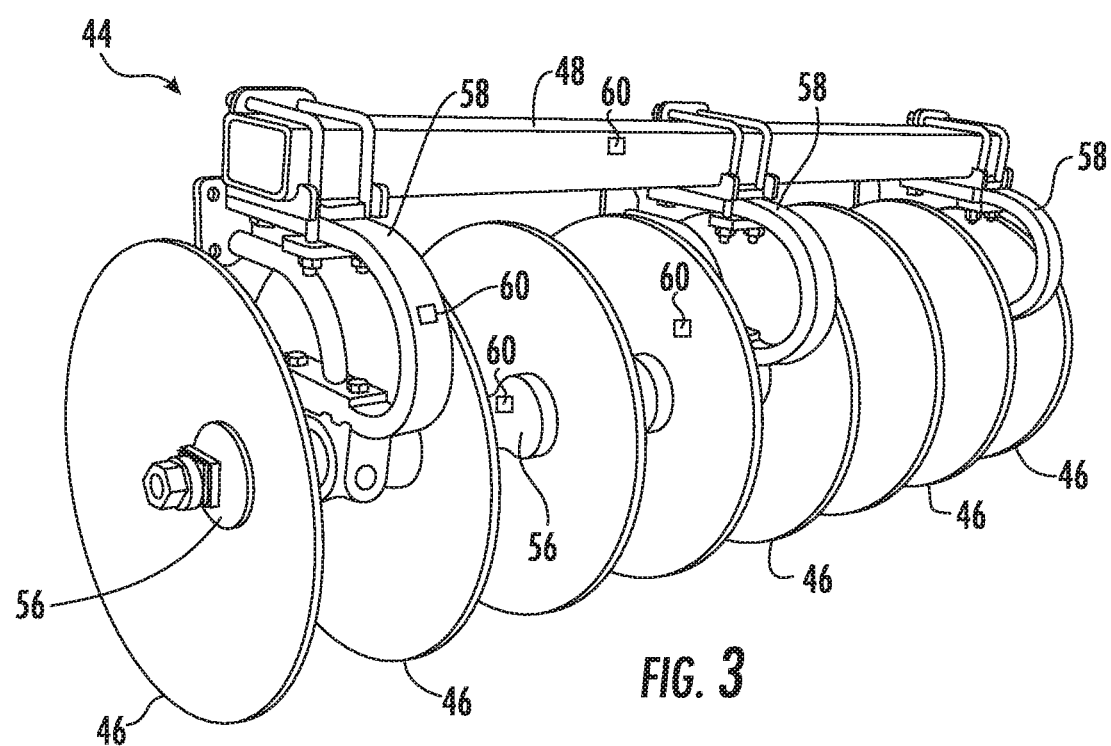
FIG. 3 illustrates a perspective view of a ganged tool assembly of the implement in accordance with aspects of the present subject matter, particularly illustrating the ganged tool assembly configured as a disc gang assembly of the tillage implement.

Referring now to FIG. 3, one example implementation of a ganged tool assembly described above in reference to FIGS. 1 and 2 is illustrated in accordance with aspects of the present subject matter. Specifically, FIG. 3 illustrates a perspective view of various components of the disc gang assemblies 44 of the implement 10 described above with reference to FIGS. 1 and 2. However, it should be appreciated that the aspects of ganged tool assembly described herein with reference to FIG. 3 may also be utilized with any other ganged tool assembly including any other suitable ground engaging tools of a given agricultural implement 10.

As shown in FIG. 3, the disc gang assembly 44 may include a plurality of disc blades 46 rotatably coupled to and spaced apart along the length of a disc gang shaft 56. The disc gang shaft 56 may, in turn, be positioned underneath and coupled to the toolbar 48 of the disc gang assembly 44 via one or more hangers 58 of the disc gang assembly 44. For example, in the illustrated embodiment, the hangers 58 define a C-shape that permits the disc gang shaft 56 and the disc blades 46 mounted thereon to move relative to the toolbar 48. However, it should be appreciated that, in alternative embodiments, the hanger(s) 58 may have any other suitable configuration. Furthermore, FIG. 3 illustrated a ganged tool assembly, but it should be recognized the following disclosure is generally applicable to a tool assembly including a single ground engaging tool coupled to the frame of the agricultural implement. For example, in certain situations, a single ground engaging tool or multiple ground engaging tools may be coupled to the toolbar 48 utilizing individual hangers 58 associated with each ground engaging tool.

Figure 5:
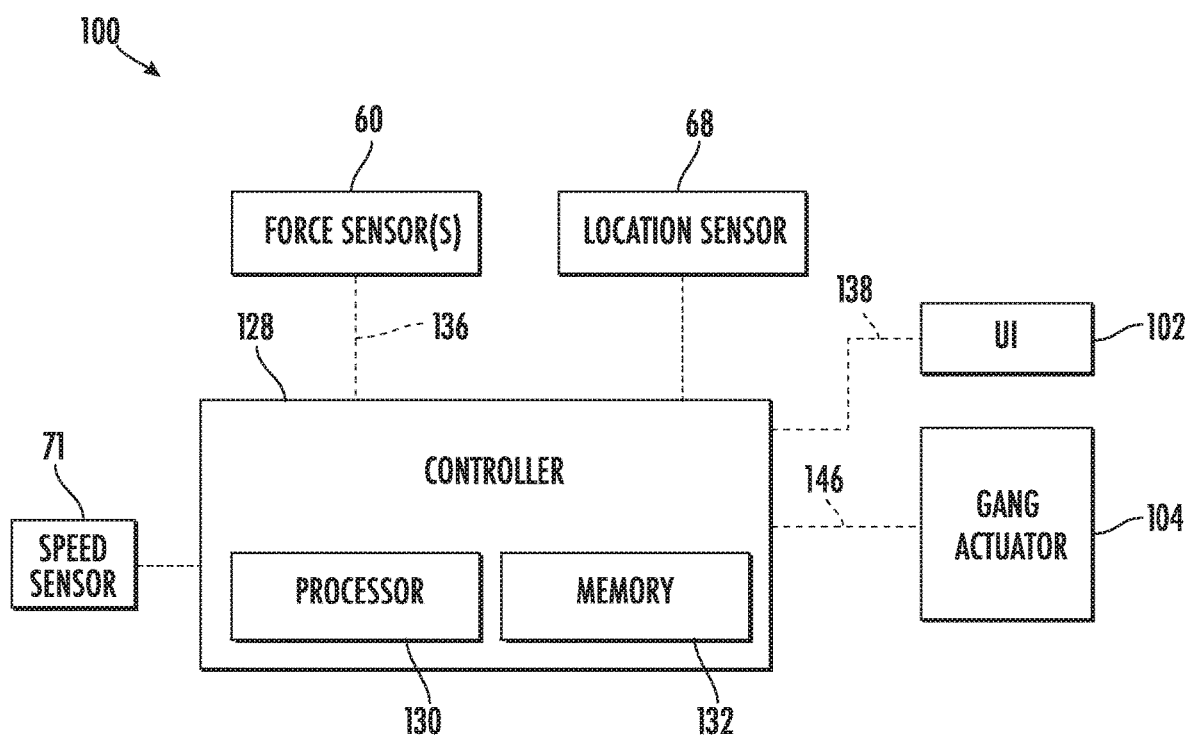
FIG. 5 illustrates a schematic view of one embodiment of a system for detecting the levelness of around engaging tools of the tillage implement in accordance with aspects of the present subject matter.

Additionally, in accordance with aspects of the present subject matter, the disc gang assembly 44 may include one or more force sensors 60 configured to detect a load acting one or more components of the disc gang assembly 44 as the implement 10 is being moved across the field and transmit associated load data to a corresponding system controller 128 (such as via one or more communicative links 136 omitted for clarity, as shown in FIG. 5), in one embodiment, the force sensor(s) 60 may correspond to one or more strain gauges or load sensors coupled to the disc gang assembly 44 and configured to detect the force exerted by the draft load on a component(s) of the disc gang assembly 44 as the disc blades 46 are being pulled through the ground. Additionally or alternatively, one or more of the force sensors 60 may be configured as a load pin or cell configured to be provided in operative association with the disc gang assembly 44 to monitor the draft load applied thereto.

As shown in FIG. 3, the force sensor(s) 60 may, in one embodiment, be mounted directly to a component(s) of the disc gang assembly 44. For instance, in the illustrated embodiment, the force sensor(s) 60 is mounted directly to one or more disc blades 46 of the disc gang assembly 44 in order to detect the load acting on the disc gang assembly 44 as the disc blades 46 are being pulled through the ground. In another embodiment, as illustrated, the force sensor(s) 60 may be mounted to the disc gang shaft 56 of the disc gang assembly 44 in order to detect the load acting on at least one component the disc gang assembly 44. In a still further embodiment, the force sensor(s) 60 may be mounted to the toolbar 48 in order to detect the load acting on at least one component the disc gang assembly 44. In additional embodiments, as further illustrated in FIG. 3, the force sensor(s) 60 may be mounted on a hanger 58 coupled between the toolbar 48 and the disc blades 46. It should be further appreciated that the force sensor(s) 60 may be arranged between various components of the disc gang assembly, such as between the hanger 58 and the toolbar 48 and/or gang shaft 56 or between the disc blade(s) 46 and the gang shaft 56.

As an example, the force sensor(s) 60 may be coupled to the concave and/or convex surfaces of one or more of the hangers 58. Alternatively or additionally, the force sensor(s) 60 may be coupled to the top of the hanger 58 and/or between the hanger 58 and the toolbar 48. As another example, the force sensor(s) 60 may be coupled to the bottom of the hanger 58 and/or between the hanger 58 and the gang shaft 56. In embodiments where the ganged tool assembly is a tool assembly, the force sensor(s) may be coupled between the hanger 58 and an individual ground engaging tool or a shaft or other intermediary structure used to couple the ground engaging tool to the hanger 58.

Referring briefly back to FIG. 2, the force sensor(s) 60 may be configured to detect the down force applied to the disc gang assembly 44, which may be indicative of the draft load applied to the disc blades 46. In such an embodiment, the force sensor(s) 60 may correspond to any suitable sensor (e.g., a load cell or pin) and may be configured to be positioned at any suitable location relative to disc gang assembly 44 that allows the sensor(s) 60 to monitor the down force applied to the disc gang assembly 44 (e.g., by positioning the sensor 60 at or adjacent to a rotational axis of the disc gang assembly 44). It should be appreciated that the sensor 60 of FIG. 2 is illustrated at a rotational axis between the actuator 104 and the frame 48. However, the sensor 60 may additionally or alternatively be placed at a rotational axis between the actuator 104 and the disc gang assembly 44 and/or to the actuator 104, such as to the rod 106, an exterior of the cylinder 108, or an interior of the cylinder 108.

It should be appreciated that FIGS. 2 and 3 provide examples of various different locations for mounting force sensors 60 associated with a disc gang assembly 44. One of ordinary skill in the art will readily appreciate that the disc gang assembly 44 described need not include each of the force sensors 60 shown in FIGS. 2 and 3. For instance, embodiments of the disc gang assembly 44 may only include one of the force sensors 60 shown in FIG. 3 or FIG. 2. It should be appreciated that, in alternative embodiments, the force sensor(s) 60 may be configured as any other suitable device for sensing or detecting a parameter indicative of the load applied to the disc gang assembly 44, such as to the disc blades 46. It should be appreciated that although the force sensor(s) 60 has been described in the context of a ganged tool assembly, one or more force sensors 60 may, for example, be provided in operative association with the ground engaging tool(s) of each ganged tool assembly to allow the draft load associated with the respective ground engaging tools to be monitored. Still further, one or more force sensors 60 may be provided, for example, in operative association with the ground engaging tool of a tool assembly to allow the draft load associated with the ground engaging tool to be monitored.

Figure 4:
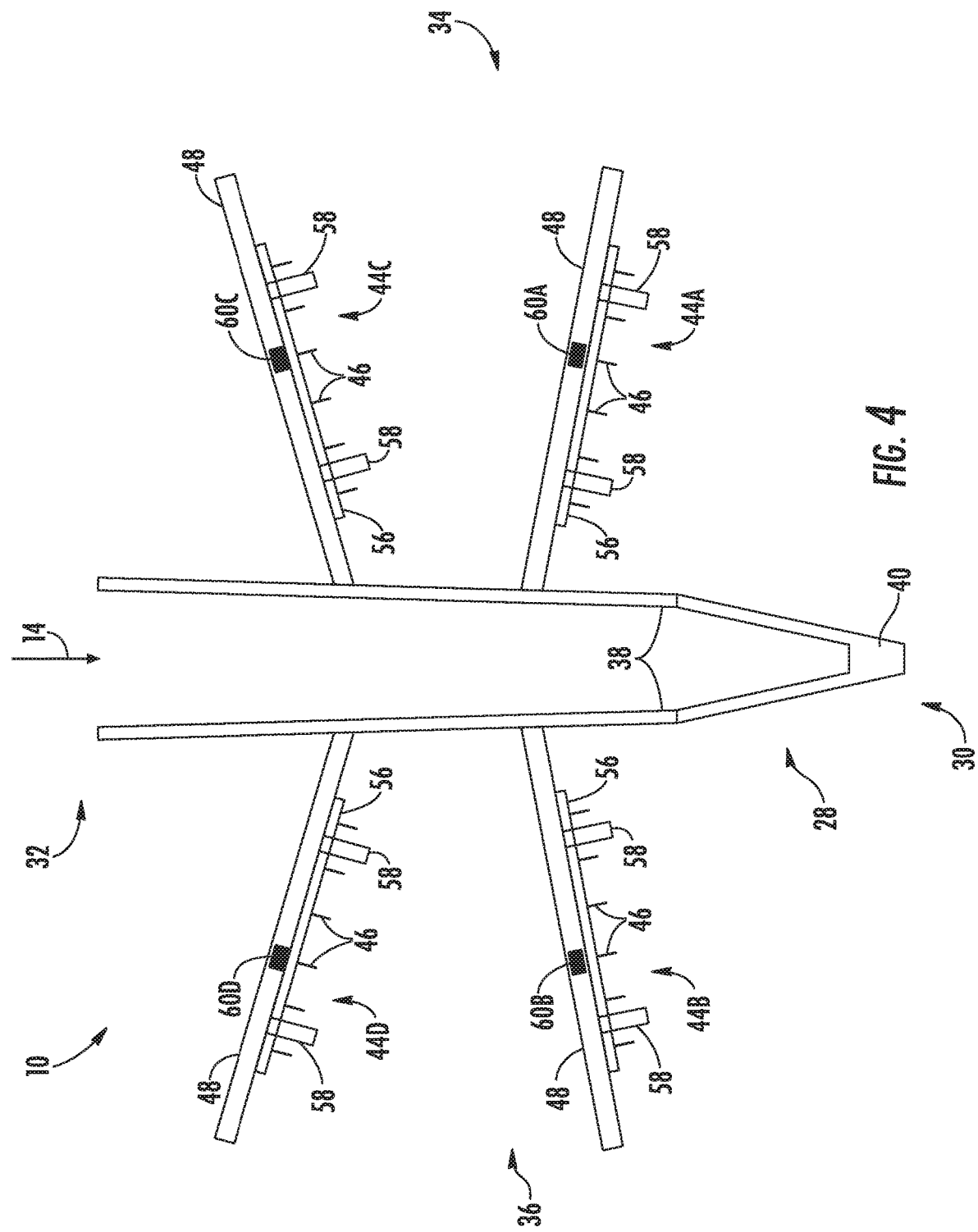
FIG. 4 illustrates an exemplary top schematic view of the disc gang assemblies of the implement in accordance with aspects of the present subject matter, particularly illustrating four disc gang assemblies and associated force sensors.

Referring now to FIG. 4, an exemplary top schematic view of the disc assemblies 44 of the implement 10 is illustrated in accordance with aspects of the present subject matter. Specifically, FIG. 4 illustrates four disc gang assemblies 44 and associated force sensors 60. It should be appreciated that the other ground engaging tools, such as shanks 50, have been omitted for clarity. It should be appreciated that aspects of the disc gang assemblies 44 described herein with reference to FIG. 4 may also be utilized with other ganged tool assemblies including any other suitable ground engaging tools of a given agricultural implement. Further, the description of FIG. 4 may generally be applicable to other tool assemblies including a ground engaging tool, such as shank 50 or disc blades 46.

The implement 10 may include a first disc gang assembly 44A and/or an opposing second disc gang assembly 44B positioned at or proximate to the forward end 30 of the implement 10 relative to the direction of travel 14. The first disc gang assembly 44A may positioned at or proximate to the first side 34 of the implement 10 relative to the direction of travel 14. Similarly, the second disc gang assembly 44B may be positioned at or proximate to the second side 36 of the implement 10. Further, the implement 10 may include a third disc gang assembly 44C and/or an opposing fourth disc gang assembly 44D positioned at or proximate to the aft end 32 of the implement 10 relative to the direction of travel 14. The third disc gang assembly 44C may positioned at or proximate to the first side 34 of the implement 10 relative to the direction of travel 14. Similarly, the fourth disc gang assembly 44D may be positioned at or proximate to the second side 36 of the implement 10. Though four disc gang assemblies 44 are illustrated in FIG. 4, other embodiments may include more or less disc gang assemblies 44, and the description here may be equally applicable to implements with more or less disc gang assemblies 44, such as two disc gang assemblies 44.

As shown in FIG. 4, each disc gang assembly 44 may be provided one or more force sensors 60 in operative association with the gang disc assembly 44 in order to detect a load acting on one or more components of each disc gang assembly 44 as described generally in regards to FIG. 3. While the force sensors 60 are shown coupled to the toolbars 48 in FIG. 4, it should be appreciated that the force sensors 60 may be coupled to any part of the disc gang assemblies 44 and/or implement 10 suitable to detect such load, e.g., hangers 58. Specifically, a first force sensor 60A may be provided in association with the first disc gang assembly 44A in order to capture data indicative of the load acting on the disc blade(s) 46 at the forward end 30 and first side 34 of the implement 10. A second force sensor 60B may be provided in association with the second disc gang assembly 44B in order to capture data indicative of the load acting on the disc blade(s) 46 at the forward end 30 and second side 36 of the implement 10. A third force sensor 60C may be provided in association with the third disc gang assembly 44C in order to capture data indicative of the load acting on the disc blade(s) 46 at the aft end 32 and first side 34 of the implement 10. A fourth force sensor 60D may be provided in association with the fourth disc gang assembly 44D in order to capture data indicative of the load acting on the disc blade(s) 46 at the aft end 32 and second side 36 of the implement 10.

Referring now to FIG. 5, a schematic view of one embodiment of a system 100 for monitoring and/or controlling the operation of one or more tool assemblies, and/or ganged tool assemblies of a tillage implement is illustrated in accordance with aspects of the present subject matter. More particularly, the system 100 may further generally detect the levelness of ground engaging tools of a tillage implement, such as one or more ground engaging tools of a tillage implement and/or associated tool assemblies. In general, the system 100 will be described herein with reference to the implement 10, disc gang assembly 44, and disc blades 46 described above with reference to FIGS. 1-4. However, it should be appreciated by those of ordinary skill in the art that the disclosed system 100 may generally be utilized with tillage implements having any other suitable implement configuration as well as ganged tool assemblies and/or ground engaging tools having any other suitable configuration. Further, though described in reference to a ganged tool assemblies, it should be appreciated the following disclosure is generally applicable to a tool assemblies each including a single ground engaging tool coupled to the frame 28 of the agricultural implement 10, such as via a hanger 58 and/or toolbar 48.

As shown in FIG. 5, the system 100 may include one or more components of the tillage implement 10 and/or the disc gang assembly 44. As shown, the system 100 may generally include a controller 128 configured to be communicatively coupled to a plurality of sensors 60, 68, 71 for monitoring one or more operating parameters associated with the implement 10. For example, in several embodiments, the system 100 may include one or more sensors configured to capture data indicative of one or more operational parameters of disc gang assembly 44 and/or disc blades 46, such as the force sensor(s) 60 described above with reference to FIGS. 2-4. However, it should be appreciated that, in alternative embodiments, the system 100 may include any other suitable components of the implement 10 and/or disc gang assembly 44, such as the gang actuator(s) 104.

In accordance with aspects of the present subject matter, the system 100 may include the controller 128 configured to electronically control the operation of one or more components of the implement 10. For instance, in response to an input indicating the implement 10 is in a cultivating state, the controller 128 may be configured to lower various ground engaging tools of the tillage implement 10, such as the disc blades 46, shanks 50, leveling blades 52, and/or basket assemblies 54, and raise such ground engaging tools in response to an input indicating the implement 10 is in a traveling state. In general, the controller 128 may comprise any suitable processor-based device known in the art, such as a computing device or any suitable combination of computing devices. Thus, in several embodiments, the controller 128 may include one or more processor(s) 130 and associated memory device(s) 132 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 132 of the controller 128 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 132 may generally be configured to store suitable computer-readable instructions that, when implemented by the processor(s) 130, configure the controller 128 to perform various computer-implemented functions, such as one or more aspects of the method 200 described below with reference to FIG. 6. In addition, the controller 128 may also include various other suitable components, such as a communications circuit or module, one or more input/output channels, a data/control bus and/or the like.

It should be appreciated that the controller 128 may correspond to an existing controller of the implement 10 or an associated work vehicle (not shown) or the controller 128 may correspond to a separate processing device. For instance, in one embodiment, the controller 128 may form all or part of a separate plug-in module that may be installed within the implement 10 or associated work vehicle 12 to allow for the disclosed system 100 and method 200 to be implemented without requiring additional software to be uploaded onto existing control devices of the implement 10 or the associated work vehicle 12.

Furthermore, in one embodiment, the system 100 may also include a user interface 102. More specifically, the user interface 102 may be configured to provide feedback (e.g., notifications associated with the operational parameters of the disc gang assembly 44 and/or the disc blades 46) to the operator of the implement 10. As such, the user interface 102 may include one or more feedback devices (not shown), such as display screens, speakers, warning lights, and/or the like, which are configured to communicate such feedback. In addition, some embodiments of the user interface 102 may include one or more input devices (not shown), such as touchscreens, keypads, touchpads, knobs, buttons, sliders, switches, mice, microphones, and/or the like, which are configured to receive user inputs from the operator. In one embodiment, the user interface 102 may be positioned within a cab 22 of the work vehicle 12 configured to tow the implement 10 across the field. However, in alternative embodiments, the user interface 102 may have any suitable configuration and/or be positioned in any other suitable location.

In several embodiments, the controller 128 may be configured to monitor one or more operational parameters of the disc gang assembly 44 and/or the associated ground engaging tools of the disc gang assembly (e.g. the disc blades 46) as the implement 10 is being moved across the field. Specifically, in one embodiment, the controller 128 may be communicatively coupled to the force sensor(s) 60 associated with the disc blades 46 of one or more disc gang assemblies 44 via a wired or wireless connection to allow operational parameter data (e.g., as indicated by dashed lines 136 in FIG. 5) to be transmitted from the force sensor(s) 60 to the controller 128. As such, the controller 128 may be configured to determine or estimate the draft load acting on the disc blades 46 as the disc blades 46 are being pulled through the ground based on the data 136 received from the sensor(s) 60. For instance, the controller 128 may include a look-up table, suitable mathematical formula, and/or algorithms stored within its memory 132 that correlates the sensor data 136 to the load acting on the disc blades 46. More specifically, the controller 128 may be configured to estimate the draft load acting on the disc blades 46 of distinct disc gang assemblies 44. For instance, the controller 128 may determine or estimate the draft load acting on the disc blade(s) 46 of the first, second, third, and/or fourth disc gang assemblies 44A, 44B, 44C, 44D utilizing data 136 received from first, second, third, and/or fourth force sensors 60A, 60B, 60C, 60D, respectively.

Generally, by monitoring the data 136 associated with the load acting on the disc blades 46 of two or more disc gang assemblies 44, the controller 128 may be able to determine the levelness of the disc blades 46 between the disc gang assemblies 44. Specifically, during operation of the implement 10, the disc gang assembly 44 (e.g., the disc blades 46) may push foreign substances, such as debris and clods, out of the direction of travel 14 of each disc gang assembly 44 while simultaneously cultivating the soil. In doing so, a draft load may act on each disc blade 46 and/or disc gang assembly 44 as the disc blades 46 cultivate the soil and move such foreign substance out of the direction of travel of each disc gang assembly 44. However, due to inconsistencies in the surface of the field to be cultivated or incorrectly positioned disc blades 46 and/or disc gang assemblies 46, a portion of the disc blades 46 may not be level in relation to the surface of the soil to be cultivated. As such, disc blades 46 that penetrate the soil to a greater degree may experience a greater draft load on the disc blades 46 and/or disc gang assemblies 44. Contrarily, disc blades 46 that penetrate the soil to a lesser degree may experience a lower draft load on the disc blades 46 and/or disc gang assemblies 44. As such, by monitoring and comparing the draft load on the disc blades 46 and/or disc gang assemblies 44 of separate disc gang assemblies 44, unlevel disc blades 46 may be inferred based on the difference in the draft loads, e.g., when the loads differ by at least a predetermined threshold value for a predetermined length of time.

Accordingly, as one example, the controller 128 may be configured to monitor the sensor data 136 received from the sensors 60A, 60B, 60C, 60D, Further, the controller 128 may be configured to compare one or more monitored values on the first side 34 of the implement 10 (e.g., the draft load associated with the first disc gang assembly 44A or third disc gang assembly 44C and/or associated disc blade(s) 46) to one or more monitored values on the second side 36 of the implement 10 (e.g., the draft load associated with the second disc gang assembly 44B or fourth disc gang assembly 44D and/or associated disc blade(s) 46). As such, the system 100 may determine that at least a portion of the disc blades 46 are not level relative to the ground between the first side 34 of the implement 10 and the second side 36 of the implement 10 such that the implement 10 is essentially parallel to the ground. For instance, the predetermined threshold value may include a predetermined load threshold value. For example, the predetermined load threshold may be selected as the maximum difference in the load acting on the disc blades 46 between disc gang assemblies 44 indicating that the disc blades 46 are level in relation to one another or approximately level in relation to one another (e.g., are penetrating the soil to the same or substantially same degree and thus experience approximately the same draft load). In such instance, the controller 128 may be configured to identify that at least a portion of the disc blades 46 are not level relative to the ground between the first side 34 and the second side 36 of the implement 10 when a difference between a first monitored value from the first and/or third sensors 60A, 60C and a second monitored value from the second and/or fourth sensors 60B, 60D exceeds the predetermined load threshold and stays there for the predetermined length of time.

As another example, the controller 128 may be configured to compare one or more monitored values on the forward end 34 of the implement 10 (e.g., the draft load associated with the first disc gang assembly 44A or second disc gang assembly 44B and/or associated disc blade(s) 46) to one or more monitored values on the aft end 32 of the implement 10 (e.g., the draft load associated with the third disc gang assembly 44C or/or fourth disc gang assembly 44D and/or associated disc blade(s) 46). As such, the system 100 may determine that at least a portion of the disc blades 46 are not level relative the ground and to the forward direction of travel 14 of the implement 10 such that the implement 10 is essentially parallel to the ground. It should be appreciated that disc blades 46 and/or gang disc assemblies 44 in a front and back relationship may not experience the same draft load even though such disc blades 46 have encountered the same soil and are penetrating the same soil to the same degree. More specifically, disc blades 46 toward the aft end 32 of the implement 10 may travel through soil that has already been cultivated by the disc blades 46 toward the forward end 30 of the implement 10, As such, disc blades 46 toward the aft end 32 of the implement may experience a reduced draft load compared to disc blades 46 toward the forward end 30 of the implement 10 even though such disc blades 46 are penetrating the soil to the same or approximately the same degree. As such, the predetermined threshold value may include a predetermined load range. For example, the predetermined load range may be selected as a range of loads between a minimum difference in the loads acting on the disc blade(s) 46 between separate disc gang assemblies 44 and a maximum difference in the loads acting on the disc blade(s) 46 between separate disc gang assemblies 44 indicating that the disc blades 46 are level in relation to the ground or approximately level in relation to ground (e.g., are penetrating the soil to the same or substantially same degree even though the draft loads may be different). In such instance, the controller 128 may be configured to identify at least a portion of the disc blades 46 are not level relative to the ground and the forward direction of travel 14 of the implement 10 when a difference between a first monitored value from the first and/or second sensors 60A, 60B and a second monitored value from the third and/or forth sensors 60C, 60D is less than the predetermined load range or is greater than the predetermined load range and stays outside of this load range for the predetermined length of time.

It should be appreciated that the load range and/or load threshold may be determined by the characteristics of the particular ganged tool assemblies 44. For instance, the load range and/or load threshold may be affected by the length of the disc gang shaft 46, the number of disc blades 46, the angle of attack of the disc blades 46, the camber angle of the disc blades 46, the size of the disc blades 46, the concavity of the disc blades 46, length or width or depth of the disc blades 46, and/or the difference in any of these characteristics between gang tool assemblies 44. However, it should be appreciated that one skilled in the art can contemplate other characteristics of the disc gang assemblies 44 that may affect the load range and/or load threshold.

As a further example, the controller 128 may be configured to compare between one or more monitored values associated with the first side 34 and the forward end 30 of the implement 10 (e.g., the draft load associated with the first disc gang assembly 44A or and/or associated disc blade(s) 46), one or more monitored values associated with the second side 36 and the forward end 30 of the implement 10 (e.g., the draft load associated with the second disc gang assembly 44B or and/or associated disc blade(s) 46), one or more monitored values associated with the first side 34 and the aft end 32 of the implement 10 (e.g., the draft load associated with the third disc gang assembly 44C or and/or associated disc blade(s) 46), and one or more monitored values associated with the second side 36 and the aft end 32 of the implement 10 (e.g., the draft load associated with the fourth disc gang assembly 44D or and/or associated disc blade(s) 46). As such, the system 100 may simultaneously determine that at least a portion of the disc blades 46 are not level relative to the ground between the first side 34 of the implement 10, the second side 36 of the implement 10, the forward end 30 of the implement 10, and the aft end 32 of the implement 10 by comparing the difference between the load acting on the disc blades 46 between disc blade assemblies 44 as described generally above. Specifically, by comparing the loads at four corners of the implement 10, the controller 128 may be able to determine the levelness of all of the disc blades 46.

Further, the controller 128 may be configured to compare one or more monitored values on the first side 34 of the implement 10 to one or more monitored values on the second side 36 of the implement 10 to determine if the implement is no longer within the field to be cultivated. The surface of a field is often at a slightly higher elevation that surrounding land in order to allow for runoff from the field. However, it is possible for the one of the sides 34, 36 of the implement 10 to unintentionally travel over the surroundings of the field such that the disc blades 46 do not cultivate the field. For instance, disc blades 46 traveling over the surroundings of the field may no longer engage or penetrate the soil. As such, in some situations, the monitored value associated with the load on disc blades 46 at the first side 34 or the second side 36 of the implement may be zero or approximately zero and thus indicate the respective disc gang assembly 44 is outside of the bounds of the field.

Though the above determination is based on the comparison of the loads acting on the disc blades 46 of four disc gang assemblies 44, it is contemplated such comparison may be utilized with any desirable number of disc blades 46 and associated disc gang assemblies 44. For instance, the monitored draft load acting on the disc blades 46 may be compared to monitored draft loads acting on each of the additional disc blades 46 and/or disc gang assemblies 44 to determine whether the disc blades 46 are level.

Furthermore, the controller 128 may be configured to initiate one or more control actions when the controller 128 determines that a portion of the disc blades 46 are not level. For example, the controller 128 may be configured to notify the operator of the implement 10 that at least a portion of the disc blades 46 are not level. Specifically, in one embodiment, the controller 128 may be communicatively coupled to the user interface 102 via a wired or wireless connection to allow feedback signals (e.g., indicated by dashed line 138 in FIG. 5) to be transmitted from the controller 128 to the user interface 102. In such an embodiment, the feedback signals 138 may instruct the user interface 102 to provide a notification to the operator of the implement 10 (e.g., by causing a visual or audible notification or indicator to be presented to the operator) that provides an indication that a portion of the disc blades 46 are not level. In such instances, the operator may then choose to initiate any suitable corrective action he/she believes is necessary, such as adjusting the downforce applied to the disc gang assembly 44 and/or adjusting the position of the disc blade(s) 46. For example, the operator may adjust the actuator 104 of one or more of the disc gang assemblies 44 by retracting the rod 106. As such, the disc blades 46 may rise relative to the ground surface in order to level out the disc blades 46. Contrarily, the operator may adjust the actuator 104 of one or more of the disc gang assemblies 44 by extending the rod 106. As such, the disc blades 46 may lower relative to the ground surface in order to level out the disc blades 46. Additionally, a down force applied to the disc gang assembly 44 may be reduced to allow the draft load to raise the disc blades 46. On the other hand, a down force to the disc gang assembly 44 may be increased in order in increase the depth of the disc blades 46 within the soil. Additionally, as described below, the controller 128 may be configured to actively control the disc gang assembly(ies) 44 when it is determined that one or more disc blades 46 are not level.

In accordance with aspects of the present subject matter, the controller 128 may be configured to control the operation of the disc gang assembly 44 and/or disc blades 46 based on the monitored operational parameter(s) deriving from the sensor data 136. Specifically, as shown in FIG. 5, the controller 128 may be communicatively coupled to one or more components of the disc gang assembly 44, such as the gang actuator 104, via a wired or wireless connection to allow control signals (e.g., indicated by dashed lines 146 in FIG. 5) to be transmitted from the controller 128 to the actuator 104. As such, the controller 128 may be configured to transmit control signals 146 to actuator 104 or associated components instructing the actuator 104 to adjust the downforce being applied to the disc gang assembly 44 and/or disc blades 46, such as by extending or retracting the actuator's rod 106 relative to the corresponding cylinder 108. For example, when it is determined that one or more of the disc blades 46 are not level (e.g., when the difference between the monitored loads of the disc gang assemblies 44 rises above the predetermined load threshold and/or falls outside of the range of load threshold) the controller 128 may be configured to transmit control signals 146 to the actuator 104 instructing the actuator 104 to raise or lower the disc gang assembly(ies) 44, and thus the disc blades 46 and/or reduce the downforce being applied to the disc blades 46 in order to level out the disc blades 46.

In an additional or alternative embodiment, the controller 128 may be configured to determine the effectiveness of the cultivation process based on the difference between one or more monitored values associated with the load acting on the disc blades 46 between separate disc gang assemblies 44. Generally, a level implement 10 will be more efficient than an implement 10 that is not level. Specifically, an implement 10 with disc blades 46 that are level or approximately level relative to the ground will cultivate the soil to a similar degree within the entire path or approximately the entire path of the implement 10 relative to the forward direction of travel 14. As such, the specific correlation between the difference in the monitored load value for the separate disc gang assemblies 44 may, for example, be determined experimentally and/or mathematically and subsequently expressed as a mathematical expression, a look-up table, and/or the like. For instance, a look-up table may be developed that correlates the magnitude of the difference in load data between disc gang assemblies 44. In addition, a suitable data fusion or sensor fusion algorithm may be utilized to analyze the data received from the sensors 60 with the output of such algorithm being used to estimate or determine the effectiveness of the cultivation process. As a further example, the controller 128 may be configured to determine the effectiveness of the cultivation process by determining whether one or more of the ground engaging tools are operating at too great of a penetration depth, are being towed through the field at too great of a speed for the penetration depth, and/or have encountered impediments or other obstructions within the field based on the difference between one or more monitored values associated with the load acting on the disc blades 46 between separate disc gang assemblies 44.

In at least one embodiment, the controller 128 may be configured to determine the compaction of the soil and/or other field condition of the soil being cultivated based on the one or more monitored values associated with the load acting on the disc blades 46 of one or more disc gang assemblies 44. For instance, larger loads generally indicate more compact soil such that it may be desirable to decrease the speed of the work vehicle 10 and/or decrease the depth of the ground engaging tools. Additionally, in several embodiments, the correlation established between the one or more monitored values associated with the load acting on the disc blades 46 of one or more disc gang assemblies 44 and the soil compaction or other field condition being monitored may also take into account the speed at which the implement 10 is being moved across the field. For instance, for a given soil compaction, the magnitude of the loads acting on the disc blades 46 and/or disc gang assemblies 44 may vary based on the ground speed of the implement 10. As an example, the disc blades 46 of the implement 10 may experience higher draft loads while the implement 10 is being moved across the field at 6 miles-per-hour (MPH) than when the implement 10 is being moved across the field at 4 MPH despite the disc blades 46 being exposed to the exact same field condition. In this regard, the controller 128 may also be coupled to a suitable speed sensor, such as the speed sensor(s) 71 described above with reference to FIGS. 1 and 2, to allow the controller 128 to monitor the ground speed of the implement 10. This speed data may then be used when interpreting the data indicative of the one or more monitored values associated with the load acting on the disc blades 46 of one or more disc gang assemblies 44 received from the sensors 60. For instance, in one embodiment, separate mathematical expressions or look-up tables may be established for correlating the load data to the soil compaction, soil type, soil moisture content, and/or other field condition at differing ground speeds, such as by establishing a separate mathematical expression or look-up table for each of a plurality of incremental ground speeds (e.g., at each speed defined between 0 MPH and 10 MPH in increments of 0.1 MPH).

Further, in certain embodiments, the correlation between differences in load data between disc gang assemblies 44 and the efficiency of the cultivation process and/or the field condition may be stored for one or more locations as the implement 10 is being moved across the field. For example, location data may be associated with each combination of differences in load data between disc gang assemblies 44, the magnitude of such load data, the efficiency of the cultivation process, or the field condition. Further, such data or combination of data may be stored within the memory device(s) 132. In this regard, the controller 128 may also be coupled to a suitable location sensor, such as the location sensor(s) 68 described above in regards to FIGS. 1 and 2, to allow the controller 128 to store the data from the sensor(s) 60, 70, 71, the levelness of the disc blades 46, the efficiency of the cultivation process, the soil compaction, and/or the field condition for one or more locations within the field, such as for each location within the field. Further, the location data from the location sensor(s) 68 may allow for the creation of a field map with geographical coordinates illustrating the levelness of the disc blades 46, the efficiency of the cultivation process, the soil compaction, and/or the field condition at one or more locations within the field. In one exemplary embodiment, the controller 128 may be configured to communicate such data (e.g., the progression of the cultivation process, the levelness of the disc blades 46, the efficiency of the cultivation process, the soil compaction, and/or the field condition) to a remote supervisor utilizing a wireless communication bus, wireless network, or similar method of communicating to a remote supervisor. For example, the controller 128 may be configured to transmit one or more of an SMS message, email, or the like to the remote supervisor.

Figure 6:
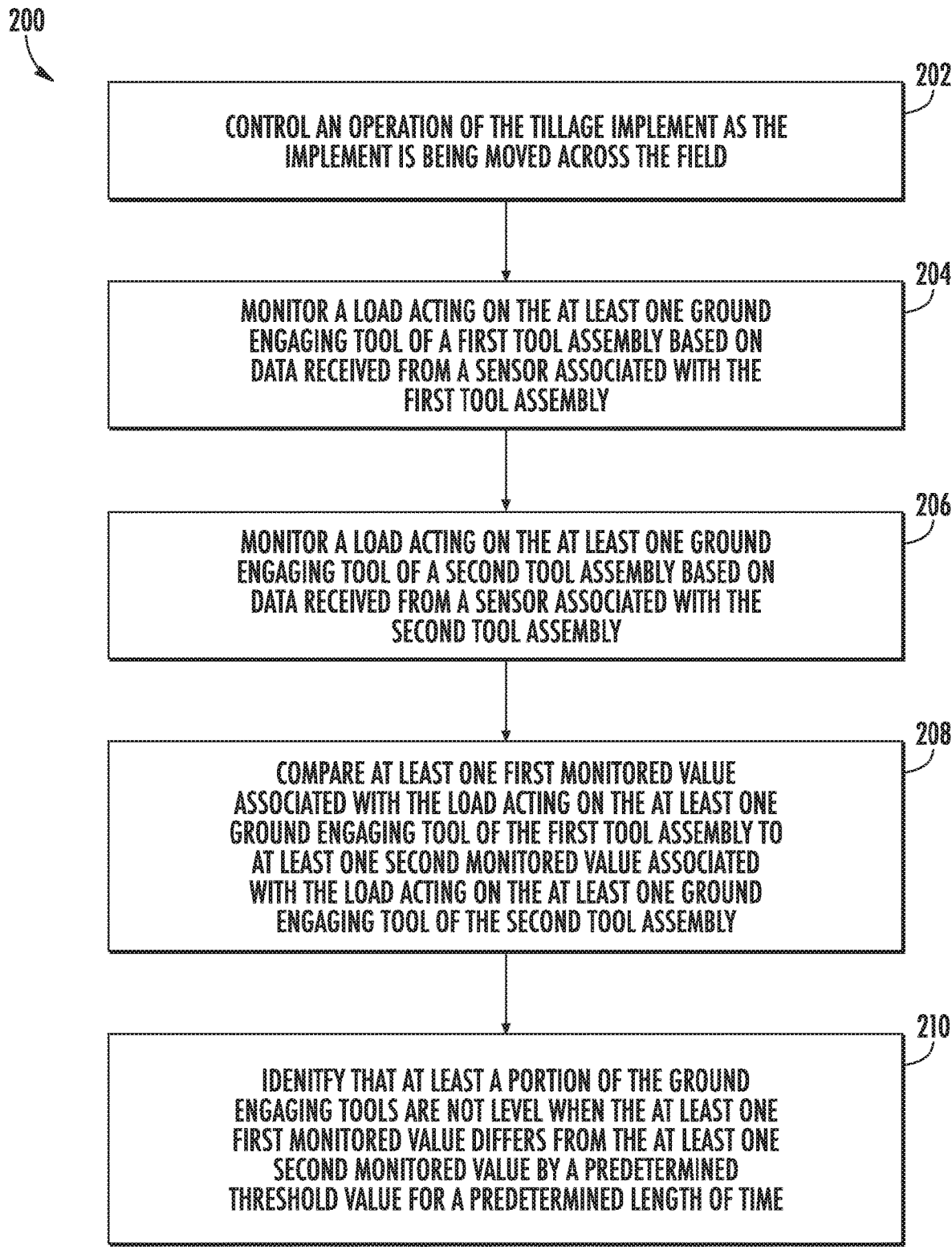
FIG. 6 illustrates a flow diagram of one embodiment of a method for detecting the levelness of ground engaging tools of a tillage implement in accordance with aspects of the present subject matter.

Referring now to FIG. 6, a flow diagram of one embodiment of a method 200 for detecting the levelness of ground engaging tools of a tillage implement is illustrated in accordance with aspects of the present subject matter. For example, the method 200 may detect whether the ground engaging tools of the tillage implement are level relative to the ground such that the tillage implement is essentially parallel to the ground. In general, the method 200 will be described herein with reference to the tillage implement 10 and the system 100 described above with reference to FIGS. 1-5, However, it should be appreciated by those of ordinary skill in the art that the disclosed method 200 may generally be utilized to detect the levelness of ground engaging tools of any tillage implement including one or more ganged tool assemblies or tool assemblies and associated ground engaging tools having any suitable implement configuration and/or in connection with any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include controlling an operation of a tillage implement as the implement is being moved across the field. For instance, as described above, the controller 128 may be configured to control the operation of one or more components of the tillage implement 10 as the implement 10 is being moved across the field.

Additionally, at (204), the method 200 may include monitoring a load acting on one or more around engaging tools based on data received from a sensor associated with a first tool assembly. For instance, as described above, the controller 128 may be communicatively coupled to one or more sensors, such as a force sensor(s) 60, which are configured to capture data 136 indicative of a draft load applied to the disc blade(s) 60. As such, the controller 128 may be configured to monitor the draft load applied to one or more of the disc blades 46 based on the sensor data 136 received from the force sensor(s) 60.

At (206), the method 200 may include monitoring a load acting one or more ground engaging tools based on data received from a sensor associated with a second tool assembly. For instance, as described above, the controller 128 may be communicatively coupled to one or more sensors, such as a force sensor(s) 60, which are configured to capture data 136 indicative of a draft load applied to the disc blade(s) 60. As such, the controller 128 may be configured to monitor the draft load applied to one or more of the disc blades 46 based on the sensor data 136 received from the force sensor(s) 60.

As an example, the first sensor 60 may be positioned at the first side 34 of the implement 10 (e.g., sensor(s) 60A, 60C), and the second sensor 60 may be positioned at the second side 36 of the implement 10 (e.g. sensor(s) 60B, 60D). As another example, the first sensor 60 may be positioned at the forward end 30 of the implement 10 (e.g., sensor(s) 60A, 60B), and the second sensor 60 may be positioned at the aft end 32 of the implement 10 (e.g. sensor(s) 60C, 60D).

Additionally, at (208), the method 200 may include comparing one or more first monitored values associated with the load acting on the at ground engaging tool(s) of the first tool assembly to one or more second monitored values associated with the load acting on the ground engaging tool(s) of the second tool assembly. For example, as described above, the controller 128 may be configured to monitor the load acting on the disc blade(s) 46 of the first gang disc assembly 44 based on data 136 received from the force sensor(s) 60 associated with the first gang disc assembly 44 and monitor the load acting on the disc blade(s) 46 of the second gang disc assembly 44 based on data 136 received from the force sensor(s) 60 associated with the second disc gang assembly 44. As such, the controller 128 may compare the load acting on the first gang disc assembly 44 to the load acting on the second gang disc assembly 44.

Furthermore, at (210), the method 200 may include identifying that at least a portion of the ground engaging tools are not level when the first monitored value(s) differs from the second monitored value(s) by a predetermined threshold value for a predetermined length of time. In one instance, as described above, the controller 128 may be configured to identify that at least a portion of the disc blades 46 are not level when the difference in loads acting on the disc blades 46 exceeds the predetermined load threshold for a predetermined length of time. In an additional or alternative example, the controller 128 may be configured to identify that at least a portion of the disc blades 46 are not level when the difference in loads acting on the disc blades 46 is less than the predetermined load range or is greater than the predetermined load range, such as for a predetermined length of time.

Moreover, the method 200 may, for example, include initiating a control action when an occurrence of unlevel disc blades is detected. For example, as described above, when disc blades 46 that are not level are identified, the controller 128 may be configured to notify an operator of the tillage implement 10, automatically adjust a position of the disc blade(s) 46 relative to a ground surface across which the tillage implement 10 is being moved, and/or adjust a downforce being applied to the disc blade(s) 46. Specifically, as described above, the controller 128 may be configured to transmit control signals 138 to the user interface 102 and/or transmit control signals 146 to the gang actuator(s) 104 to adjust one or more operating parameters of the disc blade(s) 46, such as the position of the disc blade(s) 46 and/or the downforce being applied thereto, based on the levelness of the disc blades 46. Further, the method 200 may include determining at least one condition of the soil of the field, such as soil compaction, based on the load data associated with the disc blades 46 and/or disc gang assemblies 44.

It is to be understood that the steps of the method 200 are performed by the controller 128 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 128 described herein, such as the method 200, is implemented in software code or instructions which are tangibly stored on a tangible computer readable medium. The controller 128 loads the software code or instructions via a direct interface with the computer readable medium or via a wired and/or wireless network. Upon loading and executing such software code or instructions by the controller 128, the controller 128 may perform any of the functionality of the controller 128 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art, Such other examples are intended to be within the scope of the claims if they include structural elements that do not differ from the literal language of the claims, or if they include equivalent structural elements with insubstantial differences from the literal language of the claims.

What is claimed is:

1. A system for detecting a levelness of ground engaging tools of a tillage implement, the system comprising:
   a frame;
   a plurality of tool assemblies supported relative to the frame, each tool assembly including a toolbar positioned below and coupled to the frame and at least one ground engaging tool coupled to the toolbar;
   a first sensor coupled to a first tool assembly of the plurality of tool assemblies, the first sensor configured to capture data indicative of a first draft load acting on the at least one ground engaging tool of the first tool assembly;
   a second sensor coupled to a second tool assembly of the plurality of tool assemblies, the second sensor configured to capture data indicative of a second draft load acting on the at least one ground engaging tool of the second tool assembly; and
   a controller configured to:
   monitor data received from the first sensor and the second sensor;
   compare a first monitored value associated with the first draft load acting on the at least one ground engaging tool to a monitored value associated with the second draft load acting on the at least one ground engaging tool; and
   identify that at least a portion of the ground engaging tools are not level when the first monitored value differs from the second monitored value by a predetermined threshold value.

2. The system of claim 1, wherein the controller is further configured to identify that the at least portion of the ground engaging tools are not level when the at least one first monitored value differs from the at least one second monitored value by the predetermined threshold value for a predetermined length of time.

3. The system of claim 1, wherein the first tool assembly is located at a first side of the implement, and the second tool assembly is located at a second side of the implement opposite the first side, wherein the controller is configured to identify that the at least portion of the ground engaging tools are not level between the first side and second side of the implement.

4. The system of claim 3, wherein the predetermined threshold value comprises a predetermined load threshold, the controller configured to identify that the at least portion of the ground engaging tools are not level between the first side and second side of the implement when a difference between the first monitored value and the second monitored value exceeds the predetermined load threshold.

5. The system of claim 1, wherein the first tool assembly is located at a forward end of the implement, and the second tool assembly is located at an aft end of the implement, wherein the controller is configured to identify that the at least portion of the ground engaging tools are not level relative to a forward direction of travel of the implement.

6. The system of claim 5, wherein the predetermined threshold value comprises a predetermined load range, the controller configured to identify that the at least portion of ground engaging tools are not level relative to the forward direction of travel of the implement when a difference between the first monitored value and the second monitored value is less than the predetermined load range or is greater than the predetermined load range.

7. The system of claim 3, wherein the first tool assembly and second tool assembly are each further located at a forward end of the implement, the system further comprising:
   a third sensor coupled to a third tool assembly of the plurality of tool assemblies, the third sensor configured to capture data indicative of a third draft load acting on the at least one ground engaging tool of the third tool assembly, wherein the third tool assembly is located at an aft end of the implement and at the first side of the implement; and
   a fourth sensor coupled to a fourth tool assembly of the plurality of tool assemblies, the fourth sensor configured to capture data indicative of a fourth draft load acting on the at least one ground engaging tool of the fourth tool assembly, wherein the fourth tool assembly is located at an aft end of the implement and at the second side of the implement,
   wherein the controller is further configured to identify that the at least portion of ground engaging tools are not level relative to a forward direction of travel of the implement.

8. The system of claim 1, wherein the first and second tool assemblies are each configured as a ganged tool assemblies, and wherein each ganged tool assembly includes a plurality of ground engaging tools coupled to the toolbar.

9. The system of claim 1, wherein the first and second tool assemblies each further include at least one hanger coupled between the at least one ground engaging tool and the toolbar, wherein the first sensor and second sensor are each coupled to the hanger of the first tool assembly and second tool assembly, respectively.

10. The system of claim 1, wherein at least one of the first sensor or second sensor comprises at least one of a stain gauge, load cell, or force sensor.

11. The system of claim 1, wherein the controller is further configured to initiate a control action when the controller identifies that the at least portion of the ground engaging tools are not level.

12. The system of claim 11, wherein the control action comprises at least one of notifying an operator of the tillage implement that the at least portion of the ground engaging tools are not level, adjusting a position of the at least portion of the ground engaging tools relative to a ground surface, or adjusting a downforce being applied to the at least portion of the ground engaging tools.

13. A method for detecting a levelness of ground engaging tools of a tillage implement, the implement including an implement frame and a plurality of tool assemblies supported relative to the frame, each tool assembly including a toolbar coupled to the frame and at least one ground engaging tool coupled to the toolbar, the method comprising:
   controlling, with a computing device, an operation of the tillage implement as the implement is being moved across a field;
   monitoring, with the computing device, a first draft load acting on the at least one ground engaging tool of a first tool assembly based on data received from a sensor associated with the first tool assembly;
   monitoring, with the computing device, a second draft load acting on the at least one ground engaging tool of a second tool assembly based on data received from a sensor associated with the second tool assembly;
   comparing at least one first monitored value associated with the first draft load to at least one second monitored value associated with the second draft load; and
   identifying that at least a portion of the ground engaging tools are not level when the at least one first monitored value differs from the at least one second monitored value by a predetermined threshold value for a predetermined length of time.

14. The method of claim 13, wherein the first tool assembly is located at a first side of the implement, the second tool assembly is located at a second side of the implement opposite the first side, and the predetermined threshold value comprises a predetermined load threshold, and wherein identifying that the at least portion of the ground engaging tools are not level comprises determining that the at least portion of the ground engaging tools are not level between the first side and second side of the implement when a difference between the first monitored value and the second monitored value exceeds the predetermined load threshold.

15. The method of claim 13, wherein the first tool assembly is located at a forward end of the implement, the second tool assembly is located at an aft end of the implement, and the predetermined threshold value comprises a predetermined load range, and wherein identifying that the at least portion of the ground engaging tools are not level comprises determining that the at least portion of the ground engaging tools are not level relative to a forward direction of travel of the implement when a difference between the first monitored value and the second monitored value is less than the predetermined load range or is greater than the predetermined load range.

16. The method of claim 13, further comprising:
   initiating, with the computing device, a control action when the at least one first monitored value differs from the at least one second monitored value by the predetermined threshold value for the predetermined length of time, the control action comprising at least one of notifying an operator of the tillage implement that the at least portion of the ground engaging tools are not level, adjusting a position of the at least portion of the ground engaging tools relative to a ground surface, or adjusting a downforce being applied to the at least portion of the ground engaging tools.

17. The method of claim 14, the method further comprising:
identifying that the first tool assembly or the second tool assembly is outside of the field to be cultivated when the first monitored value or the second monitored value, respectively, is zero or approximately zero.

18. The method of claim 13, further comprising:
determining at least one of a condition of a soil of the field or an effectiveness of the tillage operation based on at least one of the first monitored value or the second monitored value.

19. The method of claim 13, wherein the first and second tool assemblies are each configured as a ganged tool assemblies, and wherein each ganged tool assembly includes a plurality of ground engaging tools coupled to the toolbar, wherein the first and second tool assemblies each further include at least one hanger coupled between the plurality of ground engaging tools and the toolbar, wherein the first sensor and second sensor are each coupled to the hanger of the first tool assembly and second tool assembly, respectively.

20. A system for a tillage implement, the system comprising:
a frame;
a first tool assembly including a first toolbar coupled to the frame and a first ground engaging tool coupled to the first toolbar;
a second tool assembly including a second toolbar coupled to the frame and a second ground engaging tool coupled to the second toolbar;
a first sensor configured to capture data indicative of a first draft load acting on the first ground engaging tool;
a second sensor configured to capture data indicative of a second draft load acting on the second ground engaging tool; and
a controller operably coupled with the first sensor and the second sensor, the controller configured to:
identify a difference between the first draft load and the second draft load;
determine that the first tool assembly and the second tool assembly are level relative to a ground surface when the difference is less than a predetermined threshold value; and
determine that at least one of the first tool assembly or the second tool assembly is not level relative to the ground surface when the difference is greater than the predetermined threshold value.

* * * * *